United States Patent
Chen et al.

(10) Patent No.: US 6,546,167 B1
(45) Date of Patent: Apr. 8, 2003

(54) TUNABLE GRATING OPTICAL DEVICE

(75) Inventors: Gang Chen, Walnut, CA (US); Stephanus J. Spammer, Painted Post, NY (US); Laura A. Weller-Brophy, Corning, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 10/014,324

(22) Filed: Dec. 11, 2001

(51) Int. Cl.$^7$ ................................................. G02B 6/28
(52) U.S. Cl. ............................ 385/24; 385/37; 385/46; 359/130
(58) Field of Search ......................... 385/24, 37, 11, 385/16, 17, 30, 42, 46, 47; 359/130, 127, 124, 128

(56) References Cited

U.S. PATENT DOCUMENTS

| | | | |
|---|---|---|---|
| 5,459,799 A | 10/1995 | Weber | 385/2 |
| 5,926,300 A | * 7/1999 | Miyakawa et al. | 359/124 |
| 5,982,518 A | * 11/1999 | Mizrahi | 359/130 |
| 6,185,023 B1 | 2/2001 | Mizrahi | 359/130 |
| 6,201,634 B1 | 3/2001 | Sakuma et al. | 359/322 |
| 6,205,269 B1 | 3/2001 | Morton | 385/24 |
| 6,256,428 B1 | 7/2001 | Norwood et al. | 385/17 |

FOREIGN PATENT DOCUMENTS

EP 0 942 297 9/1999

OTHER PUBLICATIONS

Iocco, A et al. "Fast and widely tunable Bragg grating reflection filter", OFC'99, 1999, 132/ThJ1-1-134/ThJ1-3.

Jin, S et al, "Magnetically programmable fiber Bragg gratings", Electronics Letters, vol. 34, No. 22, 1998, p. 2158-2159.

Kim, SY et al. "Channel-switching active add/drop multiplexer with tunable gratings", Electronics Ltters, vol. 34, No. 1 1998, p. 104-105.

* cited by examiner

Primary Examiner—Phan T. H. Palmer
(74) Attorney, Agent, or Firm—Eric M. Smith; Svetlana Z. Short

(57) ABSTRACT

One aspect of the invention is an optical add/drop multiplexer. The optical add/drop multiplexer includes a first optical circulator, the first circulator includes a first port, a second port, and a third port. The optical add/drop multiplexer also includes a first tunable grating coupled to the first port and a second tunable grating coupled to the first grating. The optical add/drop multiplexer further includes a second optical circulator, the second optical circulator includes a fourth port, coupled to the second grating; a fifth port, and a sixth port. Wherein the first tunable grating is a fiber Bragg grating and wherein the second tunable grating is a fiber Bragg grating.

16 Claims, 2 Drawing Sheets

TUNABLE GRATING OPTICAL DEVICE

BACKGROUND OF THE INVENTION

1. Field of the Invention

The present invention relates generally to the field of wavelength division multiplexed optical communication systems and, more particularly, to an add-drop multiplexer for transferring selected optical channels between transmission paths within a wavelength division multiplexed optical communication system

2. Technical Background

Optical communication systems transmit optical signals over a wide spectrum of optical wavelengths. Such as for example, 1530 nm to 1565 nm. To more efficiently use the optical communication systems, the transmission spectrum is further divided into sub-wavebands or channels for the simultaneous transmission of multiple data streams. This simultaneous transmission of these data streams on different channels is referred to as wavelength division multiplexing. Optical communication systems that utilize wavelength division multiplexing require add/drop multiplexers in order to introduce and remove individual channels from the optical communication system. Preferably, these add/drop multiplexers should have narrow and accurate filtering characteristics. Narrow and more accurate filtering characteristics of the add/drop multiplexers enable closer channel spacing, which in turn increases the number of channels that an optical communication system can transmit.

Fiber Bragg gratings may be used to provide the filtering function in such an add/drop multiplexer. Typically, however, fiber Bragg gratings have a fixed filter wavelength and thus may only be used to add or drop a single, predetermined channel. Give cost and upgradeablity concerns, the deployment of flexible networks incorporating reconfigurable optical add/drop multiplexers is desirable. Reconfigurable add drop multiplexers are required in order to dynamically select the channel or channels to be added or dropped. The optical filters used in reconfigurable add/drop multiplexers need to have the correct bandwidth and be tunable so that the waveband reflected by the filter corresponds to channels to be added or dropped.

Two ways in which the center wavelength of a fiber Bragg grating may be tuned or changed are by utilizing the elastooptic or the thermooptic properties of the grating. The elastooptic properties of the grating may be advantageously used by straining to the grating. Typically, the shift in center wavelength is Ipm per microstrain. Additionally, the thermooptic properties of the grating may be exercised by changing the temperature of grating. Heating or cooling the grating shifts the center wavelength of the grating. For example, at a wavelength of 1550 nm the center wavelength of the grating shifts about 10 pm per degree Kelvin.

For a single fiber Bragg grating to be useful in a reconfigurable optical add/drop multiplexer, in must be capable of having its center wavelength shifted by several nanometers. Piezoelectric strain transducers have demonstrated the capability to shift the Bragg wavelength of a grating at the rate of about 2.4 nm per 100V.

SUMMARY OF THE INVENTION

One aspect of the invention is an optical add/drop multiplexer. The optical add/drop multiplexer includes a first optical circulator, the first circulator includes a first port, a second port, and a third port. The optical add/drop multiplexer also includes a first tunable grating coupled to the first port and a second tunable grating coupled to the first grating. The optical add/drop multiplexer further includes a second optical circulator, the second optical circulator includes a fourth port, coupled to the second grating; a fifth port, and a sixth port. Wherein the first tunable grating is a fiber Bragg grating and wherein the second tunable grating is a fiber Bragg grating.

In another aspect, the present invention includes an optical add/drop multiplexer. The optical add/drop multiplexer includes an optical circulator. The optical circulator including a first optical port, a second optical port and a third optical port. Wherein optical signals received by the first port are directed to the second port. Wherein optical signals received by the second port are directed to the third port. Wherein optical signals received by the third port are directed to the first port. The optical drop/add multiplexer further includes a first tunable grating coupled to the second optical port and a first tuning member coupled to the first tunable grating. Wherein the tuning member is selectively positionable in at least three positions. Wherein each of the at least three positions corresponds to a different center wavelength for the first tunable grating.

In another aspect, the present invention includes a method for removing at least a portion of an optical signal. The method includes the step of providing a first optical circulator, the first optical circulator having a first port, a second port, and a third port. The method also includes the steps of providing a first tunable grating and coupling the first tunable grating to the second port. The method further includes the steps of providing a second tunable grating and coupling the second tunable grating to the first tunable grating. The method further includes the step of providing a second optical circulator, the second optical circulator having a fourth port, a fifth port, and a sixth port. The method further includes the step of coupling the second tunable grating to the fourth port. The method further includes the steps of tuning the first tunable filter to a first predetermined center wavelength and linewidth and tuning the second tunable filter to a second predetermined center wavelength and linewidth. The method further includes the step of introducing an optical signal into the first port; wherein at least a portion of the optical signal is reflected by either the first tunable grating or the second tunable grating.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely illustrative of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
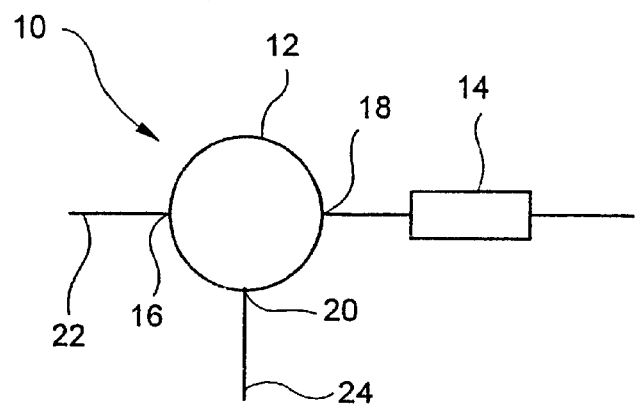
FIG. 1 is a schematic diagram of one embodiment of the present invention.

Reference will now be made in detail to the present preferred embodiments of the invention, examples of which are illustrated in the accompanying drawings. Whenever possible, the same reference numerals will be used throughout the drawings to refer to the same or like parts. One embodiment of the optical add/drop multiplexer of the present invention is shown in FIG. 1, and is designated generally throughout by the reference numeral 10. As embodied herein and depicted in FIG. 1, the add/drop multiplexer of the present invention is configured to allow the dropping or adding of two different channels from an optical signal.

As embodied herein and depicted in FIG. 1, the optical add/drop multiplexer 10 of the present invention includes a first optical circulator 12 and a tunable grating 14. The first optical circulator 12 includes three ports 16, 18, 20. Three port optical circulators are available commercially, such as, for example the 3-port optical circulators sold by New Focus, Inc. of San Jose, Calif.

The first port 16 of the first optical circulator 12 is optically coupled to an optical waveguide 22. The optical waveguide 22 may be an optical waveguide fiber, such as, for example, a single mode optical waveguide fiber or a lightwave optical circuit. The first port 16 receives an optical signal from the optical waveguide 22. Typically, the optical signal will be composed of multiple wavelengths, $\lambda_1, \lambda_2, \ldots \lambda_n$ corresponding to ITU channels. ITU channels represent standard communications wavelengths adopted by the telecommunications industry. The first optical circulator 12 directs the optical signal received by its first port 16 to its second port 18. The second port 18 of the first optical circulator 12 is coupled to a grating 14, such as, for example, a fiber Bragg grating.

Typically, a fiber Bragg grating is reflective of a waveband of light centered about a characteristic center wavelength $\lambda_c$, other wavelengths of light propagate through the grating.

In one embodiment of the present invention, the grating 14 is a tunable fiber Bragg grating. As used herein "tunable" means that the grating may be adjusted in a manner that changes either the center wavelength or linewidth of the grating or both the center wavelength and linewidth of the grating. Alternatively, the grating 14 may be a tunable grating in which the reflected waveband of the grating may be increased or decreased.

For example, if it is desired to have an add/drop multiplexer switchable between to adjacent ITU channels the grating 14 is written to have a narrow linewidth and a center wavelength midway between two channels. For example, if the add/drop multiplexer 10 of the present invention is to be switchable between ITU channel 49 having a corresponding wavelength of 1538.19 nm and ITU channel 50, having a corresponding wavelength of 1537.40 nm. The grating 14 would then be written to have a center wavelength of about 1537.8 nm. The grating 14 would also be written to have a linewidth that will not interfere with the propagation of the optical signal of the adjacent channels. Thus the grating is transparent to the optical signal. To drop a signal, the grating 14 is tuned to have a linewidth and center wavelength corresponding to the channel to be dropped. This tuning may be accomplished, for example, by inducing a linear strain gradient along the length of the grating 14, such as, for example, by attaching the grating to a cantilever beam and then bending the beam. Applying a linear strain gradient to the grating 14 will result in the linear chirping of the grating 14. Chirping the grating 14 results in an increase in the linewidth of the grating and the shifting of the grating's center wavelength. Compressing the grating 14 shifts the center wavelength in one spectral direction while tensioning the grating 14 shifts the center wavelength in the opposite direction. The grating 14 may thus be tuned to either pass the entire optical signal of reject a portion of the optical signal, such as, for example a single ITU channel.

When the grating 14 is tuned to reflect a channel, that channel is reflected back into the second port 18 of the first optical circulator the remainder of the optical signal propagates through the grating 14 and continues through the optical communication system.

In another embodiment of the present invention, the grating 14 is a tunable Bragg grating that is written to have a center wavelength and linewidth corresponding to an ITU channel when the grating is in an unstressed condition. To make the grating 14 non-reflective of the ITU channel, the grating is tuned by applying a linear strain gradient that chirps the grating 14. This chirping moves the center wavelength and linewidth of the grating so that the grating is non-reflective of ITU channels.

The first optical circulator 12 directs the reflected optical signal from the second port 18 to the third port 20 which is coupled to the waveguide 24. Thus, the selected channel is separated from the original optical signal.

Alternatively, the tunable optical device 10 may be used to add a channel to an optical signal. To use the tunable optical device 10 to add a channel to an optical signal, the tunable optical device 10 is located within an optical communication system so that an optical signal is comprised of channels other than the channel to be added enter into the grating 14 propagating in the direction of the circulator 12. The grating 14 is tuned to have a center wavelength and linewidth corresponding to the channel to be added. The channel to be added is introduced into the first port 16 of the circulator 12. The circulator 12 directs the channel to be added to its second port 18 which in turn directs it to the grating 14. The channel is reflected by the grating 14, this reflection serves to combine the channel to be added with the optical signal. The combined optical signal is then directed to the third port 20 of the circulator 12 where it is coupled into the optical waveguide 24.

Figure 2:
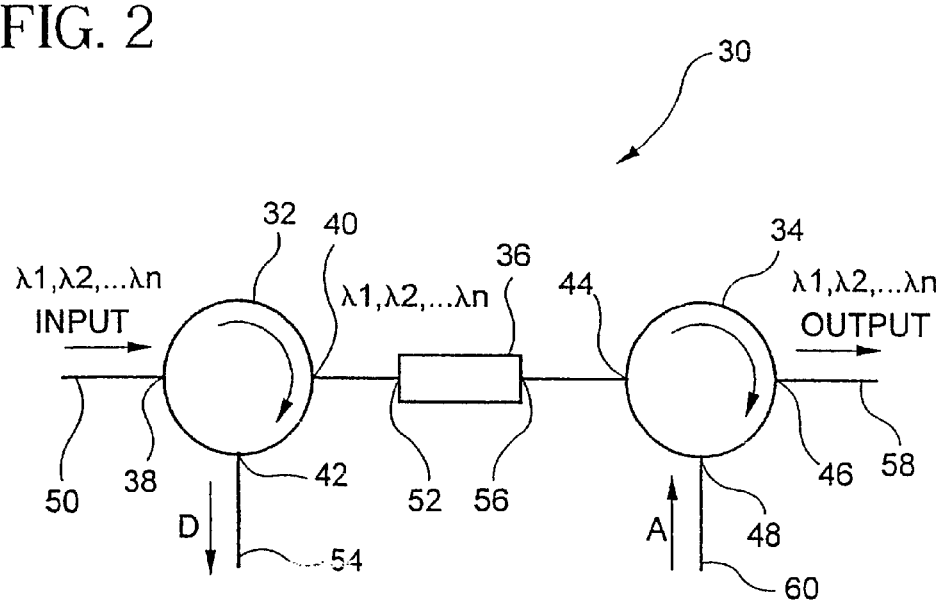
FIG. 2 is a schematic diagram of an alternative embodiment of the present invention.

Another embodiment of the optical add/drop multiplexer of the present invention is shown in FIG. 2, and is designated generally throughout by the reference numeral 30.

As embodied herein and depicted in FIG. 2, the optical add/drop multiplexer 30 of the present invention includes a first optical circulator 32, a second optical circulator 34 and a tunable grating 36. The first optical circulator 32 includes three ports 38, 42, 44. The second optical circulator 34 also includes three ports 46, 48, 50. The optical add/drop multiplexer 30 may be used to simultaneously drop and then add one of two channels. Additionally, if neither channel is to be dropped, the optical add/drop multiplexer 30 may be made transparent to an optical signal comprised of ITU channels.

The first port 38 of the first optical circulator 32 is coupled to a first optical waveguide 52. The second port 40 of the first optical circulator 32 is coupled to the first end 52 of the tunable grating 36. The third port 42 of the first optical circulator 32 is coupled to a second optical waveguide 54.

The first port 44 of the second optical circulator 34 is coupled to the second end 56 of the tunable grating 36. The second port 46 of the second optical circulator 34 is coupled to a third optical waveguide 58. The third port 48 of the second optical circulator 34 is coupled to a fourth optical waveguide 60.

The tunable grating 36 is written to have a narrow linewidth and a center wavelength midway between two channels. For example, if the add/drop multiplexer 30 of the present invention is to be switchable between ITU channel 49, having a corresponding wavelength of 1538.19 nm, and ITU channel 50, having a corresponding wavelength of 1537.40 nm. The tunable grating 36 would then be written to have a center wavelength of about 1537.8 nm. The tunable grating 36 would also be written to have a linewidth that will not interfere with the propagation of the optical signal of the adjacent channels. Thus the tunable grating 36 is transparent to an optical signal comprised of ITU channels.

The tunable grating 30 may be chirped by applying an external force. Chirping the tunable grating 36, such as, for example by tensioning the tunable grating 36, results in a shift in the linewidth and center wavelength of the tunable grating 36. Compressing the tunable grating 36 the same amount in will chirp the tunable grating 36 and shift the center wavelength an equal amount in the opposite direction. The tunable grating 36 may thus be selectively tuned to reflect one of the two predetermined ITU channels or reflect no ITU channel.

The operation of the optical add/drop multiplexer 30 is illustrated by the following example in which a single channel is first dropped from an optical signal and then added to the optical signal.

An input optical signal composed of wavelengths $\lambda_1$, $\lambda_2, \ldots \lambda_n$ corresponding to ITU channels is introduced into the first port 36 of the first optical circulator 32. The input signal is directed to the second port 40 from which it is propagates toward the tunable grating 36. The tunable grating 36 is tuned to have a center wavelength and linewidth to reflect the wavelength $\lambda_1$. The portion of the optical signal comprised of the wavelength $\lambda_1$ is reflected back into the first circulator 32 which directs the dropped wavelength $\lambda_1$ to its third port 42. The remainder of the input optical signal, $\lambda_2, \lambda_3, \ldots \lambda_n$, propagates through the tunable grating 36 and enters the first port 44 of the second optical circulator 34. A new optical signal having a wavelength $\lambda_1$ enters the third port 48 of the second optical circulator 34 from the fourth optical waveguide 60. The second optical circulator 34 routes the new optical signal to the tunable grating 36. Because the new optical signal has a wavelength equal to the center wavelength of the tunable grating 36, the new optical is reflected back into the second optical circulator 34. This reflection has the effect of combining the new optical signal with the remainder of the input optical signal, thus adding the dropped channel. The combined optical signal is directed to the second port 46 of the second optical circulator 34 from which it emerges as an output signal composed of wavelengths $\lambda_1, \lambda_2, \ldots \lambda_n$.

Figure 3:
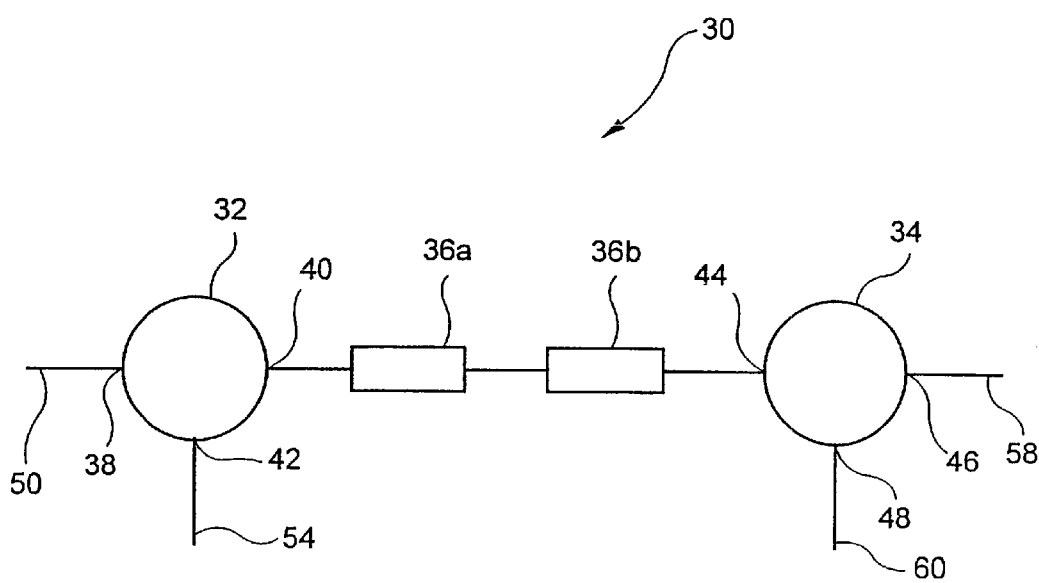
FIG. 3 is a schematic diagram of an alternative embodiment of the present invention.

In an alternative embodiment of the optical add/drop multiplexer 30 of the present invention, shown in FIG. 3, the tunable grating 36 is replaced by a plurality of tunable gratings 36a, 36b. This allows more channels to be dropped and added resulting in a optical communications system with greater flexibility.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. An optical add/drop multiplexer comprising:
   a first optical circulator, said first circulator including:
      a first port;
      a second port; and
      a third port;
   a first tunable grating coupled to said first port;
   a second tunable grating coupled to said first grating; and
   a second optical circulator, said second optical circulator including:
      a fourth port, coupled to said second grating;
      a fifth port; and
      a sixth port,
   wherein said first tunable grating is a fiber Bragg grating; and
   wherein said second tunable grating is a fiber Bragg grating.

2. An optical add/drop multiplexer comprising:
   a first optical circulator, said first optical circulator having;
      a first optical port;
      a second optical port; and
      a third optical port;
      wherein optical signals received by said first port are directed to said second port;
      wherein optical signals received by said second port are directed to said third port; and
      wherein optical signals received by said third port are directed to said first port;
   a first optical grating, said first optical grating including:
      a first end;
      a second end; and
      an first optical grating region disposed between said first end and said second end; wherein said first end is coupled to said second optical port;
   a second optical grating, said second optical grating including:
      a third end;
      a fourth end; and
      a second optical grating region disposed between said third end and said fourth end, wherein said third end is coupled to said second end; and
   a second optical circulator, said second optical circulator having;
      a fourth optical port coupled to said fourth;
      a fifth optical port; and
      a six optical port;
      wherein optical signals received by said fourth port are directed to said fifth port;
      wherein optical signals received by said fifth port are directed to said sixth port; and
      wherein optical signals received by said sixth port are directed to said fourth port;
   wherein said first grating region is tunable fiber Bragg grating; and
   wherein said second grating region is tunable fiber Bragg grating.

3. The optical add/drop multiplexer of claim 2, wherein said first grating region reflects a first waveband.

4. The optical add/drop multiplexer of claim 3, wherein said second grating region reflects a second waveband.

5. The optical add/drop multiplexer of claim 4, wherein said first waveband and said second waveband are different.

6. The optical add/drop multiplexer of claim 4, wherein said first waveband includes a first plurality of wavelengths, wherein said second waveband includes a second plurality of wavelengths and said first plurality of wavelengths is different from said.

7. An optical add/drop multiplexer comprising:
a first optical circulator, said first optical circulator having;
   a first optical port;
   a second optical port; and
   a third optical port;
   wherein optical signals received by said first port are directed to said second port;
   wherein optical signals received by said second port are directed to said third port; and
   wherein optical signals received by said third port are directed to said first port;
an optical grating region, said first optical grating region including:
   a first end;
   a second end; and
   a plurality of tunable fiber Bragg gratings disposed between said first end and said second end, wherein said first end is coupled to said second optical port; and
a second optical circulator, said second optical circulator having;
   a fourth optical port coupled to said second end;
   a fifth optical port; and
   a six optical port;
   wherein optical signals received by said fourth port are directed to said fifth port;
   wherein optical signals received by said fifth port are directed to said sixth port; and
   wherein optical signals received by said sixth port are directed to said fourth port.

8. The add/drop multiplexer of claim 7 wherein each of said plurality of fiber Bragg gratings is selectively tunable to reflect one of two optical channels.

9. The add/drop multiplexer of claim 8 wherein each of said plurality of fiber Bragg gratings is selectively tunable reflect one of two adjacent optical channels or to be non-reflective of both of said two adjacent optical channels.

10. The add/drop multiplexer of claim 7 wherein each of said plurality of fiber Bragg gratings is tunable between at reflective state and a transmissive state for at least one optical channel.

11. An optical add/drop multiplexer comprising:
an optical circulator, said circulator including:
   a first optical port;
   a second optical port; and
   a third optical port;
   wherein optical signals received by said first port are directed to said second port;
   wherein optical signals received by said second port are directed to said third port; and
   wherein optical signals received by said third port are directed to said first port;
a first tunable grating coupled to said second optical-port; and
a first tuning member coupled to said first grating, said tuning member selectively positionable in at least three positions;
wherein each of said at least three positions corresponds to a different center wavelength for said first grating.

12. An optical add/drop multiplexer comprising:
an optical circulator, said circulator including:
   a first optical port;
   a second optical port; and
   a third optical port;
   wherein optical signals received by said first port are directed to said second port;
   wherein optical signals received by said second port are directed to said third port; and
   wherein optical signals received by said third port are directed to said first port;
a plurality of tunable gratings sequentially coupled to one another, wherein one grating is coupled to said second optical port; and
a first tuning member coupled to said first grating, said tuning member selectively positionable in at least three positions;
wherein each of said at least three positions corresponds to a different center wavelength for said first grating.

13. A method for removing at least a portion of an optical signal:
providing a first optical circulator; the first optical circulator having:
   a first port;
   a second port; and
   a third port;
providing a first tunable grating;
coupling the first tunable grating to said second port;
providing a second tunable grating;
coupling the second tunable grating to the first tunable grating;
providing a second optical circulator, the second optical circulator having:
   a fourth port;
   a fifth port; and
   a sixth port;
coupling the second tunable grating to the fourth port;
tuning the first tunable filter to a first predetermined center wavelength and linewidth;
tuning the second tunable filter to a second predetermined center wavelength and linewidth;
introducing an optical signal into the first port; wherein at least a portion of the optical signal is reflected by either the first tunable grating or the second tunable grating.

14. The method of claim 13 further comprising the steps of:
introducing a second optical signal into the sixth port, wherein the second optical signal includes light of the first predetermined wavelength.

15. The method of claim 14 further wherein the second optical signal further includes light of the second predetermined wavelength.

16. The method of claim 13 further comprising the steps of:
introducing a second optical signal into the sixth port, wherein the second optical signal includes light of the second predetermined wavelength.

* * * * *